United States Patent Office 2,832,188
Patented Apr. 29, 1958

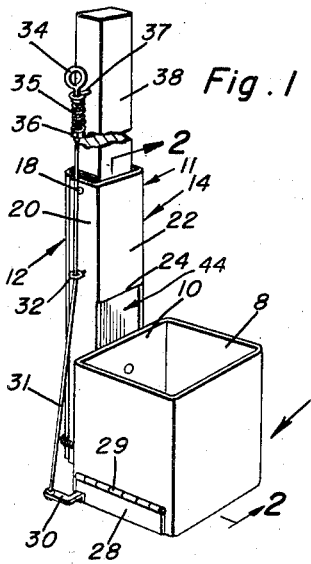
April 29, 1958    B. E. HARRELL ET AL    2,832,188
TELESCOPING NUT GATHERER WITH SPRING BIASED JAWS
Filed Sept. 6, 1956
Billy E. Harrell
Charlie B. Courson
INVENTORS.
BY *Attorneys*

2,832,188

TELESCOPING NUT GATHERER WITH SPRING BIASED JAWS

Billy E. Harrell and Charlie B. Courson, Nashville, Ga.

Application September 6, 1956, Serial No. 608,318

4 Claims. (Cl. 56—328)

The present invention relates to a manually usable implement or device which is expressly, although not necessarily, constructed and designed to enable a user thereof to expeditiously pick up and harvest nuts, pecans, for example, without bending and stooping as in the hand harvesting practices currently invoked.

As the preceding general statement of the nature of the invention reveals, or is intended to, hand implements to avoid bending and stooping are, of course, not new. As a matter of fact, nut gathering devices and, more specifically, golf ball retrievers which are characterized by a handle or a reach member and pick-up means on the lower end thereof are old and well known. It follows, therefore, that it is an object of the instant invention to structurally, functionally and otherwise improve upon analogous prior art adaptations.

In carrying out a preferred embodiment of the invention a gathering and collecting receptacle is used. This may be an opened top box-like receiver or a so-called can. Preferably, the can is provided adjacent its bottom with a spring closed mechanically openable door which permits the trapped nuts to be handily discharged into a sack or an equivalent collector. A reach handle of suitable height is employed and operatively connected with the receiver and jaw-equipped lifting means is also cooperable with the handle and receiver whereby a user may walk about, place the jaw means over the pecans or nuts one at a time and by handling the device according to plan, may attend to his nut gathering and harvesting chore with a minimum expenditure of time and effort.

Stated somewhat more specifically, the invention is characterized by inner and outer tubular members with the aforementioned box-like receiver attached to the lower end portion of the outer tubular member and with a part of the latter provided with an opening through which the nuts are delivered into the receiver usually one at a time. The inner tubular member is mounted on the lower end of the reach member or handle and, with the handle, telescopes into the outer tubular member and providing appropriate jaw means the pick-up, lifting and handling steps are carried out in an expedient and successful manner.

Other objects, features and advantages will become more readily apparent from the following description and the accompanying sheet of illustrative drawings.

In the drawings:

Fig. 1 is a perspective view on a small scale and with a portion of the handle broken away showing a nut pick-up and gathering or harvesting device constructed in accordance with the principles of the invention;

Fig. 2 is a fragmentary view on a larger scale taken approximately on the vertical line 2—2 of Fig. 1 looking in the direction of the arrows;

Fig. 3 is a view similar to Fig. 2 and in fact based somewhat on Fig. 2 and showing the relationship of the parts when the nuts are lifted and one nut is dumped into the receiver;

Fig. 4 is a section on the line 4—4 of Fig. 2; and

Fig. 5 is a bottom plan view.

Referring now to the drawings it will be seen that, generally construed, the over-all device is characterized by two principal components; namely, the receiver and outside tubular member on the one hand and the handle or reach member and its tubular member, the latter attached to the lower end of the handle and telescoping and sliding in the outside tubular member.

The receiver is denoted generally by the numeral 6 and it comprises that which is sometimes called a box and, in other instances, a can. It is of light weight metal and generally is rectangular and is open at the top as at 8. Cooperating with the wall 10 of the receiver is the aforementioned vertically elongated outside tubular member 11. The latter comprises a pair of half-sections or components each of which is channel-shaped in cross-section and one of which is denoted by the numeral 12 and the other one by the numeral 14. As perhaps best shown in Fig. 4 the side flanges of the channels are overlapped and the flanges 16 fit within and are hingedly connected at their upper ends as at 18 with the companion flanges 20. The intermediate portion of the web 22 as seen in Figs. 1, 2 and 3 is provided with a discharge opening 24 which is located wholly above the upper open top of the box 6. That portion of the web below the opening 24 is riveted or otherwise fixedly secured to the wall 10 as seen in Figs. 2 and 3 and denoted at 26. Notice in this connection that the bottom of the box 6 is above the lower edge portion of the channel member 14. One side wall of the box is provided with an appropriate discharge opening closed by a trap door 28, which is hingedly mounted at 29. Door 28 is provided at one end with an operating angle member or bracket 30 which in turn has a push-pull rod 31 hingedly connected thereto and extending upwardly through a guide eye 32 and being provided on its upper end with a finger ring 34 for handy operation. There is a coil spring 35 provided and this encircles the upper end of the rod and is adjustably tensioned as at 36. There is a guide eye or eye screw 37 provided and this is mounted on the wooden or equivalent reach rod or handle 38. The latter is adapted to telescope into and operate within the open ended tubular member 11 in an obvious manner. More specifically, the handle is provided at its lower portion with a second tubular member and this is in some respects similar to that already described. That is to say, it embodies a first channel-shaped member 40 which is secured by wood screws or the like 42 to the handle. The complemental channel-shaped member 44 is hingedly attached at its upper end to the complemental section as at 42. The lower end portions extend below the lower end 46 of the handle 38 where they are fashioned into inturned lateral bends 48 providing jaws in the manner shown. The web portion of the channel member 44 is provided with an opening 50 which is shiftably registrable with the aforementioned discharge opening 24 in the manner shown in Fig. 3.

Attention is directed to an internally disposed coil spring situated beneath the lower end 46 of the handle which spring is denoted at 52 having one end anchored at 54 to the web or the channel section 44 and the other end anchored at 56 to the web of the opposed and companion channel member or section 40. This construction allows the jaw at the right in Fig. 1 to spread away from the left jaw making the latter the relatively stationary jaw. This movement also imparts movement to the web 22 of the outer channel section 14 of the outer tubular member. The jaws are maintained together or ready-to-function position by way of a coil spring 58, the median portion of which is stretched across the web 22 and the end portions 60 of which are directed laterally and anchored on outstanding ears or tongues 62 carried by the lower end portion of the channel section 12. In practice a chain 64 is provided and has end attached to the outer tubular member at the top and the other end is attached as at 66 to the handle.

In practice the lower end portion of the outer tubular member 11 is brought into alignment with a pecan or nut which is to be picked up and the latter is allowed to enter in an obvious manner somewhat as taught by the illustration in Fig. 2. Assuming that the handle and inner tubular member are now in a down position as also seen in this figure it will be evident that by exerting downward pressure on the handle the jaws spread apart as permitted by the swinging movement of the channel section 14 on its pivot means 18 and the corresponding swinging of the channel member 44 on its pivot means 42, resisted, of course, by the combined action of the coil springs 52 and 58. By picking up at least two nuts in the manner shown and then on the third nut lifting the handle the handle and the tubular member or the lower end thereof will slide upwardly relative to the outer tubular member 11 and the openings 50 and 24 will come into alignment, as shown in Fig. 3 whereupon the nut at the top will spill over into the receiver 6 in an obvious manner. By practice and skill one may soon learn how to "spot" the jaw means and to operate the handle means in an alternating fashion to pick up, to lift and dump the pecans one by one into the receiver. When the receiver is full the trap door may be opened by way of the push-pull rod 31 as is reasonably well evident from the showing seen in Figure 1. The emptied nuts may be collected in a sack, bag, barrel or the like for grading, packaging and shipping.

The foregoing is considered as illustratively only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A nut gathering and collecting device comprising a first open ended vertically elongate tubular member, a second tubular member telescoping and slidably mounted in said first tubular member and provided at its upper end with a reach member constituting a handle and provided at its lower end portion with spring biased openable and closable jaw means, said first tubular member being provided with a discharge opening and equipped with a receiver cooperable with said discharge opening, said second tubular member being further provided with an opening which is optionally registrable with said first named opening, depending on the relative relationship and positions of the respective tubular members.

2. The structure defined in claim 1, and wherein said first tubular member is made up of a pair of sections channel-shaped in cross-section having overlapping flange portions hingedly connected together at the upper ends of said sections.

3. The structure defined in claim 1, and wherein said first tubular member is made up of a pair of sections channel-shaped in cross-section having overlapping flange portions hingedly connected together at the upper ends of said sections, and said second tubular member is also made up of a pair of opposed members channel-shaped in cross-section and having flanges hingedly connected to each other.

4. A nut pick-up and gathering device comprising a receiver having sides and being open at its top, a first tubular member with walls and having a lower portion of a wall thereof fixed to a side of said receiver and having a lower portion thereof equipped with openable and closable spring biased means adapted to be aligned with a selected nut so that it may be trapped in said first tubular member and so that as the nuts are picked up one-by-one and pile up one on top of the other in said first tubular member it is possible to feed them for deposit into the receiver, a vertically elongated handle aligned with and operatively cooperable with said first tubular member, said first tubular member and one of said walls being provided with a discharge opening through which the stacked nuts are passed one by one from said first tubular member into said receiver, said receiver being provided at the bottom thereof with a spring closed mechanically openable trap door, a remote controlled push-pull rod slidably mounted on said tubular member for manual actuation and operatively connected with said trap door, and a second tubular member connected to the lower end of said handle, slidably mounted in said first tubular member, provided at a lower end portion thereof with spring biased jaws, and further provided with an opening operatively cooperable with said discharge opening.

References Cited in the file of this patent

UNITED STATES PATENTS

| | | |
|---|---|---|
| 1,775,142 | Sanborn | Sept. 9, 1930 |
| 2,188,768 | Demory | Jan. 30, 1940 |
| 2,516,622 | George | July 25, 1950 |
| 2,706,657 | Talley | Apr. 19, 1955 |
| 2,737,007 | Pickering | Mar. 6, 1956 |